(12) United States Patent
Song

(10) Patent No.: US 8,320,975 B2
(45) Date of Patent: Nov. 27, 2012

(54) APPARATUS AND METHOD FOR IMPROVING SENSITIVITY OF DUAL-STANDBY PORTABLE TERMINAL

(75) Inventor: Young Kwang Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 788 days.

(21) Appl. No.: 12/363,300

(22) Filed: Jan. 30, 2009

(65) Prior Publication Data

US 2009/0197637 A1      Aug. 6, 2009

(30) Foreign Application Priority Data

Feb. 4, 2008   (KR) .................. 10-2008-0011115

(51) Int. Cl.
*H04B 1/38* (2006.01)
(52) U.S. Cl. .................... 455/574; 455/552.1
(58) Field of Classification Search ............. 455/234.2, 455/574, 522, 552.1, 551
See application file for complete search history.

(56) References Cited

U.S. PATENT DOCUMENTS

| 8,082,001 | B2* | 12/2011 | Lee | 455/552.1 |
| 2001/0006900 | A1 | 7/2001 | Hanninen | |
| 2004/0259516 | A1 | 12/2004 | Hwang et al. | |
| 2006/0030373 | A1* | 2/2006 | Park | 455/574 |
| 2007/0082716 | A1* | 4/2007 | Behzad et al. | 455/574 |
| 2008/0051132 | A1 | 2/2008 | Lim | |
| 2011/0053542 | A1* | 3/2011 | Jin et al. | 455/234.2 |

FOREIGN PATENT DOCUMENTS

| CN | 1 976 516 A | 6/2007 |
| EP | 0 987 825 A1 | 3/2000 |
| KR | 100 765 484 B1 | 10/2007 |
| WO | 2008/071054 A1 | 6/2008 |

OTHER PUBLICATIONS

Xuejun Zhang, "Recent Advances and Future Trends of the Multimode Wireless Terminal", IEEE International Conference, May 1, 2007, pp. 1-4, XP031094654, ISBN: 978-1-4244-1039-2.

* cited by examiner

*Primary Examiner* — Tu X Nguyen
(74) *Attorney, Agent, or Firm* — Jefferson IP Law, LLP

(57) ABSTRACT

An apparatus and method for controlling Low Noise Amplifiers (LNAs) in a dual standby portable terminal according to communication modes are provided. The apparatus and method improve the received signal sensitivity of the receiving unit of the dual-standby portable terminal. The main controller generates an active control signal when a state of the main controller is switched from a reception standby mode to a call mode, and transmits the active control signal to a sub-controller. The sub-controller maintains a turned on state of an LNA under the control of the sub-controller, according to the active control signal.

14 Claims, 7 Drawing Sheets

APPARATUS AND METHOD FOR IMPROVING SENSITIVITY OF DUAL-STANDBY PORTABLE TERMINAL

PRIORITY

This application claims the benefit under 35 U.S.C. §119 (a) of a Korean patent application filed in the Korean Intellectual Property Office on Feb. 4, 2008 and assigned Serial No. 10-2008-0011115, the entire disclosure of which is hereby incorporated by reference.

BACKGROUND OF THE INVENTION

1. Field of the Invention

The present invention relates to dual-standby portable terminals. More particularly, the present invention relates to an apparatus and method for removing interference in a dual-standby portable terminal, thereby improving received signal sensitivity of the dual-standby portable terminal.

2. Description of the Related Art

As portable terminals have become widely used, manufacturers have developed portable terminals with an increasing amount of functions. In recent years, multi-mode portable terminals have appeared on the market, which can use two or more wireless communication networks.

Portable terminals that support only one type of wireless communication network can perform communication within only a corresponding wireless communication network service area. The multi-mode portable terminals, however, can perform communication within at least two or more wireless communication network service areas. Dual mode portable terminals can support a Code Division Multiple Access (CDMA) network and a Global System for Mobile communication (GSM) network, so that they can perform communication within both CDMA and GSM network service areas. The dual mode portable terminals can be more widely used than the single mode portable terminals.

However, since the conventional multi-mode portable terminals switch between networks in such a way that they are booted, enter an idle mode, and then perform communication by operating their menu, they are complicated to operate and require a lot of time to switch their modes.

To address the above-mentioned problems a dual standby portable terminal has been proposed, which can simultaneously support two networks, for example, a CDMA network and a GSM network.

A Low Noise Amplifier (LNA) is installed in a receiving unit of respective communication modules in a dual standby portable terminal and repeatedly and periodically operates, according to the slot index cycle, as power is supplied on and off.

However, the LNA requires a certain period of time from when it receives power until it is stabilized. During this period of time, transmission power, generated as any one of the communication modules enters a communication mode, may be applied to an LNA of the other communication module in a reception standby mode.

SUMMARY OF THE INVENTION

An aspect of the present invention is to address at least the above-mentioned problems and/or disadvantages and to provide at least the advantages described below. Accordingly, an aspect of the present invention is to provide an apparatus and method for improving the sensitivity of a dual standby portable terminal.

Another aspect of the present invention is to provide an apparatus and method for improving the sensitivity of a dual standby portable terminal that adaptively controls Low Noise Amplifiers (LNAs) according to communication modes.

Another aspect of the present invention is to provide an apparatus and method for improving the sensitivity of a dual standby portable terminal that prevents oscillation of a low noise amplifier due to interference of transmission power that is caused by a communication module in a call mode.

Another aspect of the present invention is to provide an apparatus and method for improving the sensitivity of a dual standby portable terminal that maintains a turned on state of a low noise amplifier of a communication module in a reception standby mode and thus prevents the degradation of the sensitivity of the low noise amplifier due to transmission power of another communication module in a call mode.

In accordance with an aspect of the present invention, a method for improving received signal sensitivity in a dual standby portable terminal is provided. The method includes generating, by a main controller, an active control signal when a state of the main controller is switched from a reception standby mode to a call mode, and transmitting the active control signal to a sub-controller, and maintaining, by the sub-controller, a turned on state of an LNA under control of the sub-controller, according to the active control signal.

In accordance with another aspect of the present invention, a method for improving received signal sensitivity in a dual standby portable terminal is provided. The method includes detecting, by a main controller, whether a communication event occurs in a reception standby mode, switching, by the main controller, a state of the main controller to a call mode corresponding to the communication event, generating, by the main controller, an active control signal corresponding to the call mode and transmitting the active control signal, switching, by the main controller, a state of the main controller from the call mode to a reception standby mode when the communication event is terminated, and generating, by the main controller, an inactive control signal corresponding to the reception standby mode and transmitting the inactive control signal.

In accordance with another aspect of the present invention, a method for improving received signal sensitivity in a dual standby portable terminal is provided. The method includes switching a mode of an LNA to a non-slotted mode and maintaining a turned on state of the LNA when a sub-controller detects a reception of an active control signal, and switching a mode of an LNA to a slotted mode and repeatedly turning on and off the LNA when the sub-controller detects a reception of an inactive control signal.

In accordance with another aspect of the present invention, an apparatus for receiving a radio frequency signal in a dual standby portable terminal is provided. The apparatus includes first and second controllers for generating control signals corresponding to communication modes and transmitting them to the other controller, in which the first and second controllers control the power of their LNAs according to the control signals of the other controller, respectively, and first and second LNAs, one of which is repeatedly turned on/off or another of which remains turned on, according to the control of the first and second controllers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, exemplary embodiments of the present invention are described based on a dual standby portable terminal that is operational with a Code Division Multiple Access (CDMA) network and a Global System for Mobile communication (GSM) network. However, it should be understood that the present invention is not limited to the networks identified herein. For example, the dual standby portable terminal according to the present invention can support a network that is composed of one or more types of networks.

In addition, although exemplary embodiments of the present invention are described based on a dual standby portable terminal that can simultaneously support two networks to clearly show the features of exemplary embodiments of the present invention, it will be appreciated that the dual standby portable terminal can be applied to multi-standby portable terminals that simultaneously support three or more networks.

Exemplary embodiments of the present invention propose a portable terminal that supports a dual standby function. It also proposes a method to control a Low Noise Amplifier (LNA) at a receiving unit of the dual standby portable terminal, in reception standby mode, to prevent oscillation of the LNA that is caused as transmission power is input in communication mode, and to prevent a degradation of the sensitivity of the receiving unit.

Figure 1A:
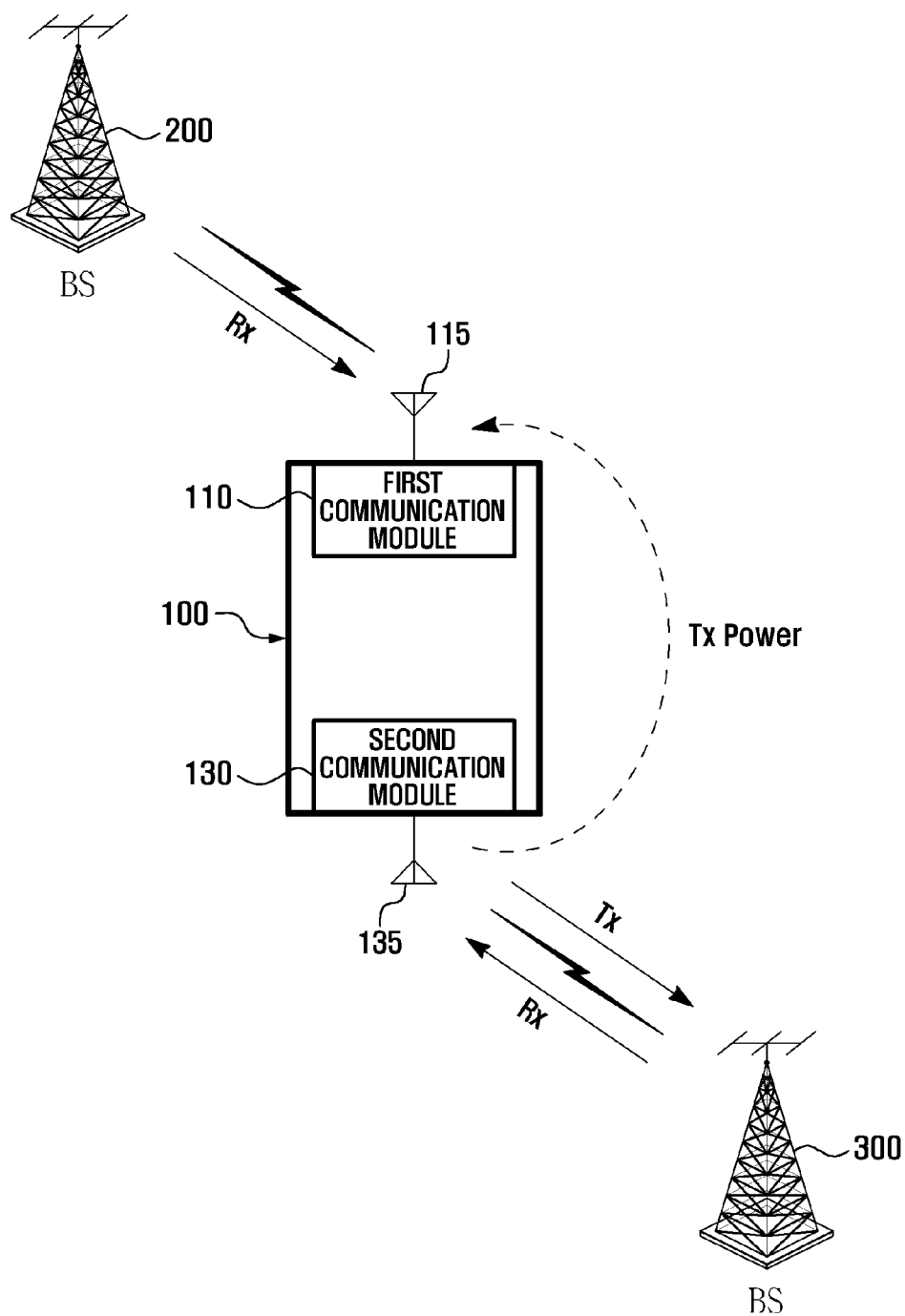
FIG. 1A is a view illustrating a communication system between a network and a dual standby portable terminal according to an exemplary embodiment of the present invention.
Figure 1B:
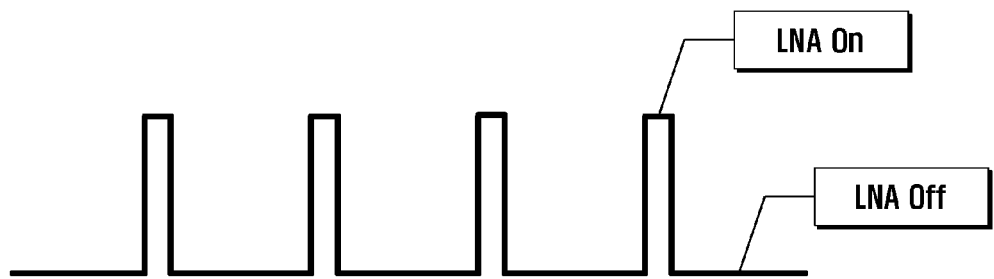
FIG. 1B is a wave form describing the switching of a Lower Noise Amplifier (LNA) of a portable terminal according to a slot index cycle, according to an exemplary embodiment of the present invention.

FIG. 1A and FIG. 1B are views describing a function of the system according to exemplary embodiments of the present invention.

FIG. 1A is a view illustrating a communication system between a network and a dual standby portable terminal according to an exemplary embodiment of the present invention. FIG. 1B is a wave form describing the switching of an LNA of a portable terminal according to a slot index cycle, according to an exemplary embodiment of the present invention.

Referring to FIG. 1A, it is assumed that the communication system is in a reception standby mode where the first communication module 110 of the portable terminal 100 detects a signal of a Base Station (BS) 200 for a CDMA network in a call mode where the second communication module 130 is performing communication through a base station 300 for a GSM network.

As shown in FIG. 1B, an LNA of a Radio Frequency (RF) receiving module in the communication modules 110 and 130 is periodically turned on and off according to a predefined slot index cycle. That is, in order to reduce power consumption in a reception standby mode, the LNA is periodically turned on and off according to a slot index cycle.

When the second communication module 130 is in a call mode, Transmission (Tx) power may be propagated to an antenna 115 of the first communication module 110 from an antenna 135 of the second communication module 130.

When the transmission power of the second communication module 130 is applied to the LNA of the first communication module 110, the LNA of the first communication module 110 oscillates and the received signal sensitivity of the first communication module 110 may be degraded by approximately 10 dB or more.

When a dual standby portable terminal is in a state where one communication module is in a call mode and another communication module is in a reception standby mode, degradation of received signal sensitivity occurs in the LNA in the another communication module due to the reception of transmission power from the one communication module operating in a call mode. If this degradation of received signal sensitivity is resolved, the dual standby portable terminal can improve its performance.

Figure 2:
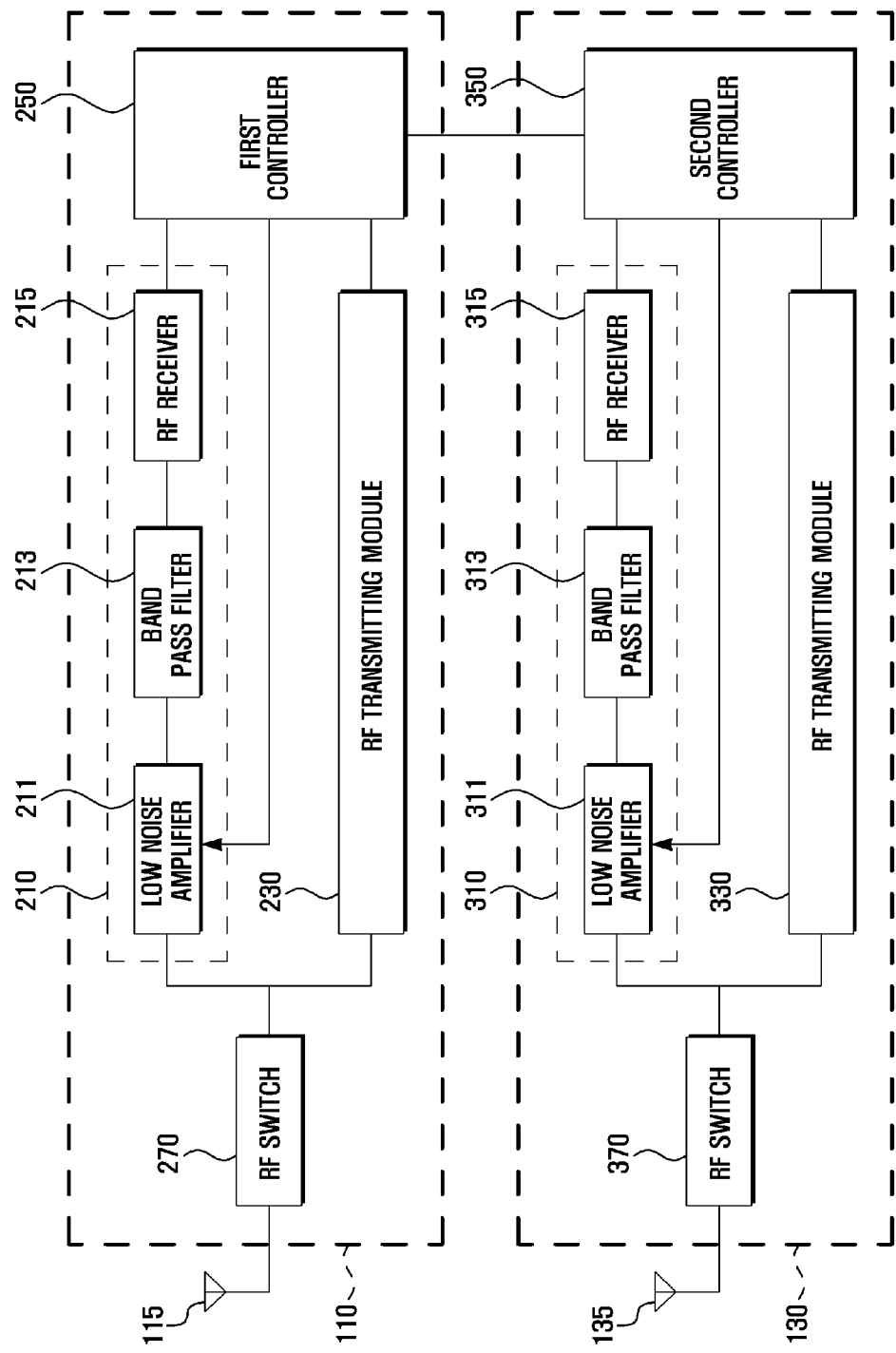
FIG. 2 is a schematic block diagram illustrating a dual standby portable terminal according to an exemplary embodiment of the present invention.

FIG. 2 is a schematic block diagram illustrating a dual standby portable terminal according to an exemplary embodiment of the present invention.

As shown in FIG. 2, the first communication module 110 and the second communication module 130 are similar to each other in configuration but are different in that they establish communication channels with different network base stations.

Due to this configuration, only the first communication module 110 is primarily explained in the following description. In an exemplary embodiment of the present invention, it should be understood that the dual standby portable terminal might further include additional units, such as a memory, a display unit, an input unit, etc.

Referring to FIG. 1A and FIG. 2, the dual standby portable terminal 100 includes a first antenna 115, a first communication module 110, a second antenna 135, and a second communication module 130. The dual standby portable terminal 100 communicates with respective base stations 200 and 300.

The first and second antennas 115 and 135 transmit or receive signals in corresponding frequency bands for communication with the base stations 200 and 300, respectively.

The first communication module 110 establishes a communication channel with the base station 200 through the first antenna 115. It transmits or receives RF signals to or from the base station 200, according to the communication protocol of the first network (for example, a CDMA network). It includes an RF receiving module 210, an RF transmitting module 230, a first controller 250, and an RF switch 270.

The RF receiving module 210 receives and processes an RF signal transmitted from the base station 200. It includes an LNA 211, a band pass filter 213, and an RF Receiver (RFR) 215.

The LNA 211 amplifies a signal, received from the base station 200 through the first antenna 115 and the RF switch 270, with a minimal amount of noise, and then outputs the signal.

The band pass filter 213 filters the signal amplified by the LNA 211 with respect to a frequency band for use by the dual standby portable terminal 100 and then outputs the filtered signal. In an exemplary embodiment of the present invention, the band pass filter 213 is implemented with a Surface Acoustic Wave (SAW) filter.

The RF receiver 215 converts an analog signal filtered by the band pass filter 213 into a digital signal and then outputs the digital signal to the first controller 250.

The RF transmitting module 230 processes an RF signal to be transmitted to the base station 200. The RF transmitting module 230 converts a digital signal, output from a base band processor of the first controller 250, into an analog signal and then transmits the analog signal through the RF switch 270 and the first antenna 115. The RF transmitting module 230 includes a Power Amplifier (PA), an RF Transmitter (RFT), etc. A detailed description of the RF transmitting module 230 is omitted in the application for conciseness.

The first controller 250 is a processor dedicated to controlling the first communication module 110 to communicate with the first network. It controls signal flow between the RF receiving module 210, the RF transmitting module 230, and the RF switch 270. When the first controller 250 receives a call reception request from the first network or a call connection request for the first network from a user, it controls communication with the first network using the first communication module 110.

The first controller 250 includes a base band processor that converts a digital signal, output from the RF receiving module 210, into an analog signal and also converts an analog signal, output from a microphone (not shown), into a digital signal. The first controller 250 is implemented with a modem chip that includes a voice call processor for compressing or restoring voice signals, transmitted or received through the base band processor, and a data signal processor for processing data signals.

In order to reduce the power consumption of the LNA 211, the first controller 250 controls the LNA 211 to be repeatedly turned on and off, according to a predefined slot index cycle, while the dual standby portable terminal 100 is in the reception standby mode. The first controller 250 controls the LNA 211 to be turned on and off, according to the slot index cycle, through a control line.

The first controller 250 controls the LNA 211 to enter a non-slotted mode, through the control line, according to a control signal received from the second controller 350, so that the LNA 211 can remain turned on.

The first controller 250 generates a control signal according to the communication mode state switch and transmits the control signal to another controller, i.e., a second controller 350. When entering a call mode, the first controller 250 generates an active control signal and transmits the active control signal to the second controller 350 through a control line. On the contrary, when entering a reception standby mode, the first controller 250 generates an inactive control signal and transmits the inactive control signal to the second controller 350 through a control line.

The RF switch 270 can transmit and receive RF signals, through the first antenna 115, using the RF receiving module 210 and the RF transmitting module 230.

The second communication module 130 establishes a communication channel with the base station 300 through a second antenna 135. It transmits or receives RF signals to or from base station 300, according to a communication protocol of the second network (for example, a GSM network). The second communication module 130 includes an RF receiving module 310, an RF transmitting module 330, a second controller 350, and an RF switch 370. The RF receiving module 310 includes an LNA 311, a band pass filter 313 and an RF receiver 315. Since the second communication module 130 is similar to the first communication module 110 in terms of the configuration, its detailed description is omitted in the following description for conciseness.

When one of the first and second communication modules 110 and 130 of the dual standby portable terminal 100 enters a communication mode, an LNA of the communication module in a reception mode may suffer from degradation of received signal sensitivity because it receives transmission power from the communication module in a communication mode. Exemplary embodiments of the present invention propose an apparatus and method that efficiently improves the sensitivity degradation of the LNA of the communication module in a reception standby mode. Exemplary embodiments of the present invention are described, assuming that the first communication module 110 is in a reception standby mode and the second communication module 130 enters a call mode, with reference to FIG. 3.

Figure 3:
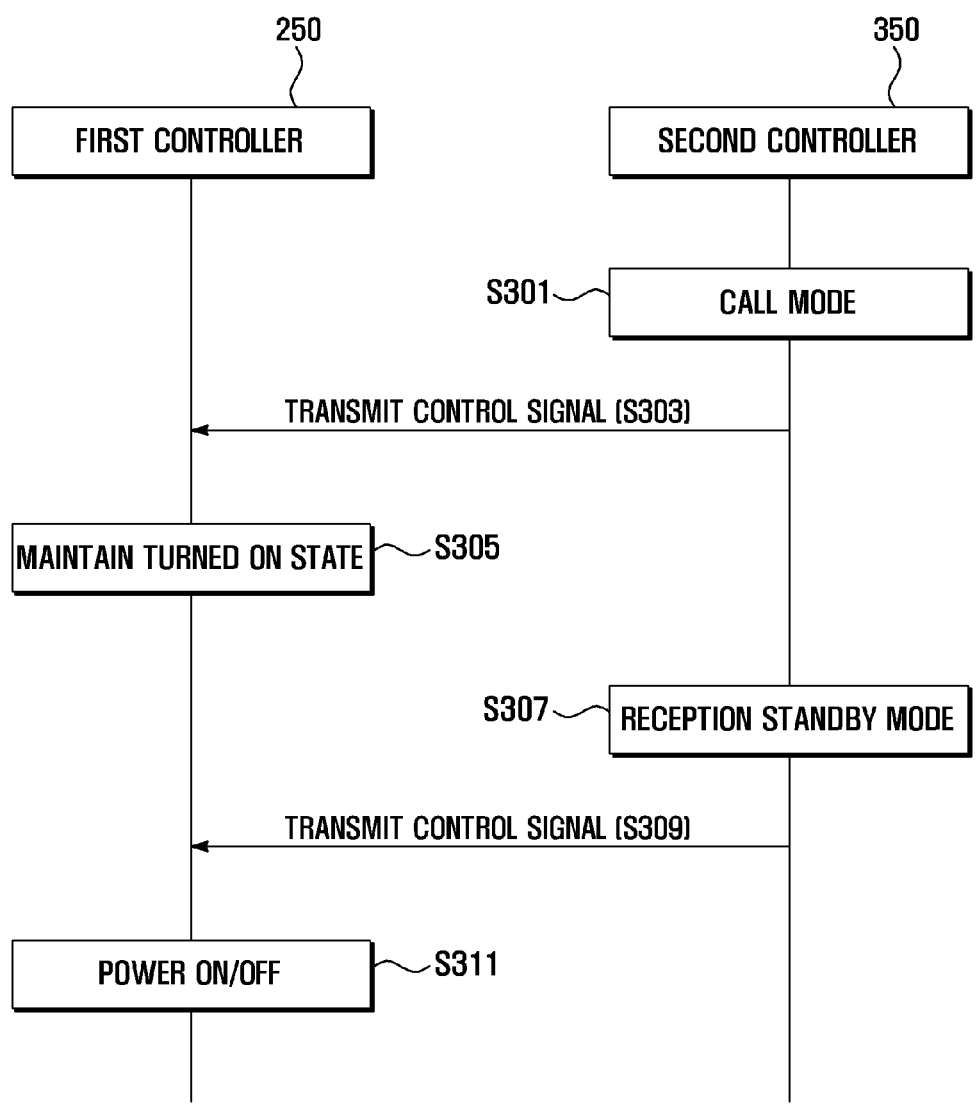
FIG. 3 is a signal flow chart describing a method for controlling an LNA based on communication modes in a dual standby portable terminal according to an exemplary embodiment of the present invention.

FIG. 3 is a signal flow chart describing a method for controlling an LNA based on communication modes in a dual standby portable terminal according to an exemplary embodiment of the present invention.

Referring to FIG. 2 and FIG. 3, when the second communication module 130 enters a call mode in step S301, the second controller 350 generates a preset control signal corresponding to the state change and then transmits the control signal to the first controller 250 of the first communication module 110 in step S303.

The first controller 250 controls the LNA, so that it enters a non-slotted mode and can remain turned on in step S305.

When the second communication module 130 terminates a call mode and re-enters a reception standby mode in step S307, the second controller 350 generates a preset control signal corresponding to the state change and then transmits the control signal to the first controller 250 of the first communication module 110 in step S309.

The first controller 250 controls the LNA 211, so that it re-enters a slotted-mode and then periodically turns on and off, according to a preset slot index cycle in step S311.

As such, the dual standby portable terminal can be operated in such a way that, while one of the communication modules enters and maintains a call mode, an LNA of another communication module in a reception standby mode remains turned on, so that malfunction of the LNA and degradation of received signal sensitivity due to the oscillation of the LNA can be substantially prevented.

In the following description, a method for controlling an LNA is described that improves the received signal sensitivity in a dual standby portable terminal. It should be understood that the present invention is not limited to the following exemplary embodiments.

In the following description, referring to FIG. 4 to FIG. 6, a controller that performs a controlling operation according to the communication mode state change is referred to as a main controller. A controller that is in a reception standby mode and receives a control signal from the main controller is referred to as a sub-controller.

An active control signal and an inactive control signal indicate control signals that the main controller transmits to the sub-controller in a reception standby mode in order to inform the sub-controller of the state change.

Figure 4:
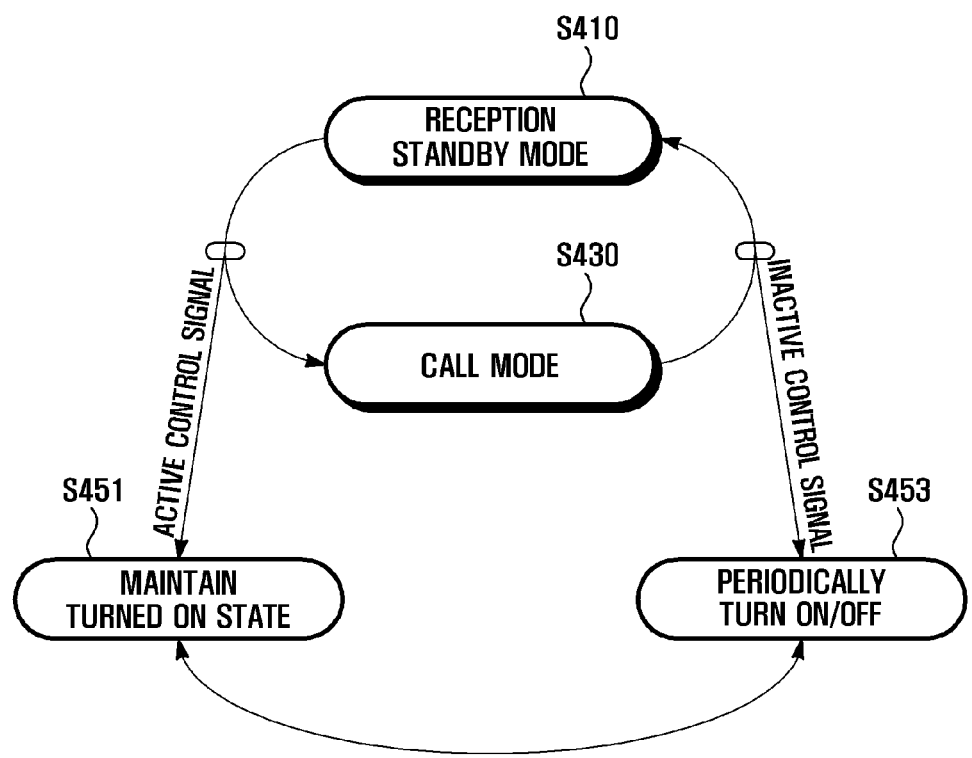
FIG. 4 is a control state diagram based on communication modes according to an exemplary embodiment of the present invention.

FIG. 4 is a control state diagram based on communication modes according to an exemplary embodiment of the present invention.

Referring to FIG. 4, when a controller in one communication module, which corresponds to a main controller, detects a state change from a reception standby mode in step S410 to a call mode in step S430, it generates an active control signal and transmits the active control signal to a controller in another communication module in a reception standby mode, which corresponds to a sub-controller. Then, the sub-controller controls an LNA under its control so that the LNA remains turned on in step S451.

When the main controller detects a state change from a call mode in step S430 to a reception standby mode in step S410, it generates an inactive control signal and then transmits the inactive control signal to the sub-controller. The sub-controller controls an LNA under its control so that the LNA is turned on and off according to a slot index cycle in step S453.

Figure 5:
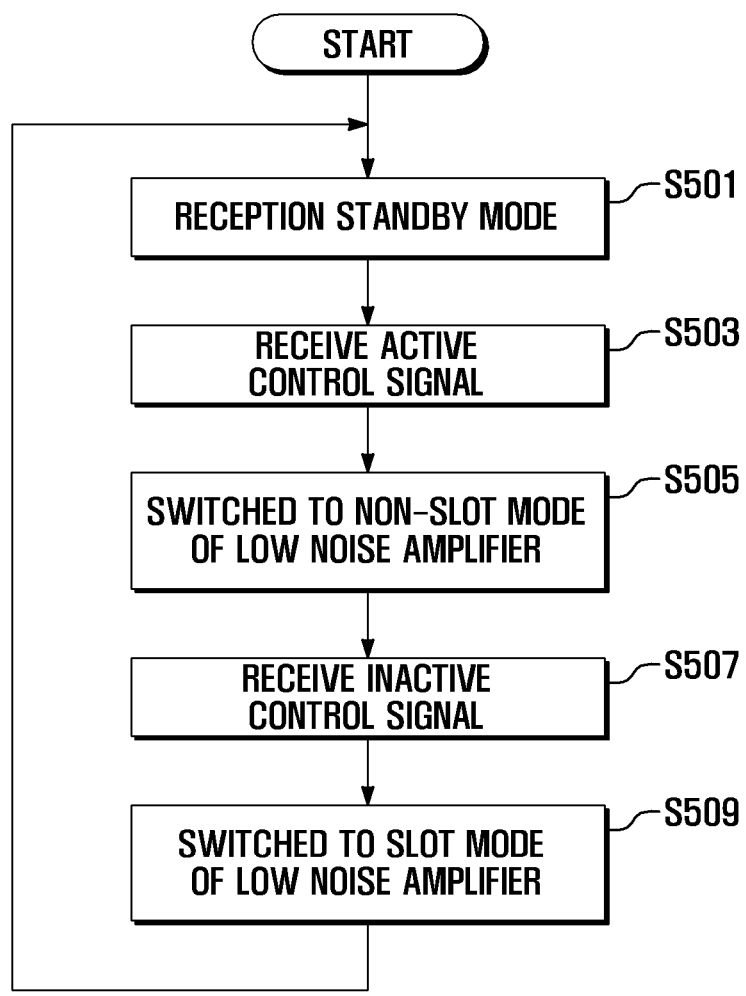
FIG. 5 is a flowchart describing a control operation of a sub-controller in a reception standby mode, according to an exemplary embodiment of the present invention.

FIG. 5 is a flowchart describing a control operation of a sub-controller in a reception standby mode, according to an exemplary embodiment of the present invention.

Referring to FIG. 5, the sub-controller determines whether a control signal is received according to a mode state change of the main controller at a reception standby mode in step S501. When the sub-controller receives a control signal from the main controller, it determines the type of control signal.

When the control signal is an active control signal that corresponds to a state where the main controller enters a call mode in step S503, the sub-controller switches a mode of an LNA under its control to a non-slotted mode in step S505. That is, while the main controller maintains a call mode, the sub-controller controls the LNA so that the LNA remains turned on.

Next, the sub-controller determines whether a control signal is received according to a mode state change of the main controller. When the sub-controller receives a control signal from the main controller, it determines the type of control signal.

When the control signal is an inactive control signal that corresponds to a state where the main controller enters a reception standby mode from a call mode in step S507, the sub-controller switches a mode of the LNA under its control to a slotted mode in step S509. That is, in order to reduce the power consumption as the main controller switches to a reception standby mode, the sub-controller controls the LNA so that the LNA is repeatedly turned on and off according to a slot index cycle.

Figure 6:
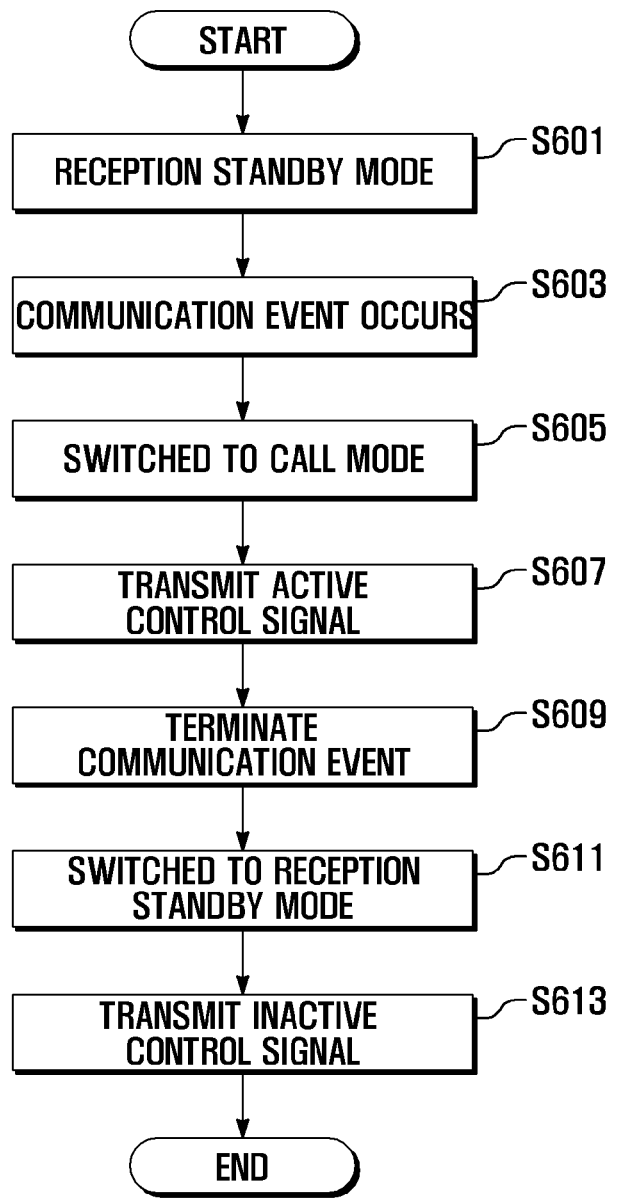
FIG. 6 is a flowchart describing a control operation of a main controller in a call mode, according to an exemplary embodiment of the present invention.

FIG. 6 is a flowchart describing a control operation of a main controller in a call mode, according to an exemplary embodiment of the present invention.

Referring to FIG. 6, the main controller is in a reception standby mode in step S601 and determines whether a communication event occurs in step S603. The communication event includes call execution events by an incoming call from a network and by an outgoing call according to a user's request.

When the main controller detects the occurrence of a communication event at step S603, the main controller switches its state from the reception standby mode to a call mode in step S605. After that, the main controller generates an active control signal according to the call mode entrance and then transmits it to the sub-controller in step S607.

The main controller processes the communication event in the call mode and then determines whether the communication event is terminated in step S609. When the main controller ascertains that the communication event is terminated at step S609, the main controller switches its state from the call mode to a reception standby mode, again, in step S611. After step S611, the main controller generates an inactive control signal according to the reception standby mode entrance and then transmits the inactive control signal to the sub-controller in step S613.

As described above, although exemplary embodiments of the present invention are described based on a dual standby portable terminal that supports CDMA and GSM networks, i.e., a CDMA/GSM dual standby portable terminal, it should be understood that the present invention is not limited to the exemplary embodiments supporting CDMA and GSM networks. That is, it will be appreciated that the dual standby portable terminal according to exemplary embodiments of the present invention can be applied to multi-standby portable terminals that can support any currently provided communication networks and communication networks developed in the future as well as a combination thereof.

As described above, the apparatus and method for improving the sensitivity of dual standby portable terminal, according to exemplary embodiments of the present invention, can prevent an LNA of a communication module in a reception standby mode from oscillating due to transmission power of another communication module that enters a call mode. When one of the communication modules enters a call mode, an LNA of the other communication module can remain turned on while the one communication module is in a call mode. Therefore, exemplary embodiments of the present invention can prevent malfunction of an LNA of a communication module in a reception standby mode and degradation of received signal sensitivity of the LNA, for example, degradation by 10 dB.

While the present invention has been described with reference to certain exemplary embodiments thereof, it will be understood by those skilled in the art that various changes in form and details may be made therein without departing from the spirit and scope of the present invention as defined in the appended claims and their equivalents.

What is claimed is:

1. A method for improving received signal sensitivity in a dual standby portable terminal, the method comprising:
generating, by a first controller of a first communication module having a first Low Noise Amplifier (LNA), an active control signal in response to a state of the first controller switching from a reception standby mode to a call mode, and transmitting the active control signal to a second controller of a second communication module having a second LNA; and
maintaining, by the second controller, a turned on state of the second LNA under control of the second controller, according to the active control signal.

2. The method of claim 1, wherein the second controller controls the second LNA to enter a non-slotted mode when the second controller receives the active control signal.

3. The method of claim 1, further comprising:
generating, by the first controller, an inactive control signal in response to the state of the first controller switching from the call mode to the reception standby mode, and transmitting the inactive control signal to the second controller.

4. The method of claim 3, wherein the second controller switches a mode of the second LNA to a slotted mode, when the second controller receives the inactive control signal, and repeatedly turns on and off the second LNA, according to a preset slot index cycle, in the slotted mode.

5. The method of claim 1, wherein the first communication module supports a communication network that is different than the communication network that the second communication module supports.

6. A method for improving received signal sensitivity in a dual standby portable terminal, the method comprising:
detecting, by a first controller of a first communication module, whether a communication event occurs in a reception standby mode;
switching, by the first controller, a state of the first controller to a call mode corresponding to the communication event;
generating, by the first controller, an active control signal corresponding to the call mode and transmitting the active control signal;
maintaining, by a second controller of a second communication module, a turned on state of the second LNA under control of the second controller, according to the active control signal;
switching, by the first controller, a state of the first controller from the call mode to a reception standby mode when the communication event is terminated; and
generating, by the first controller, an inactive control signal corresponding to the reception standby mode and transmitting the inactive control signal,
wherein the active and inactive control signals comprise control signals that the first controller transmits to the second controller of the second communication module in a reception standby mode to inform the second controller of a state change of the first-controller.

7. The method of claim 6, wherein the first communication module supports a communication network that is different than the communication network that the second communication module supports.

8. An apparatus for receiving a radio frequency signal in a dual standby portable terminal, the apparatus comprising:
first and second controllers for generating control signals corresponding to communication modes and for transmitting them to the other controller, in which the first and second controllers control the power of their Low Noise Amplifiers (LNAs) according to the control signals of the other controller, respectively; and
first and second LNAs, one of which is repeatedly turned on/off or another of which remains turned on, according to the control of the first and second controllers,
wherein the second controller maintains a turned on state of the second LNA under control of the second controller, according to the control signals transmitted to the second controller by the first controller.

9. The apparatus of claim 8, wherein:
the first and second controllers generate an active control signal in response to their states switching from a reception standby mode to a communication mode and transmit the active control signal to an opposite controller; and
the first and second controllers generate an inactive control signal in response to their states switching from a communication mode to a reception standby mode and transmit the inactive control signal to an opposite controller.

10. The apparatus of claim 9, wherein the active and inactive control signals comprise control signals to be transmitted from the first and second controllers to the other controller in order to report a communication mode state change.

11. The apparatus of claim 9, wherein:
the first controller switches a mode of the first LNA to a non-slotted mode when the first controller receives the active control signal and maintains a turned on state of the first LNA; and
the first controller switches a mode of the first LNA to a slotted mode when the first controller receives the inactive control signal and repeatedly turns on and off the first LNA.

12. The apparatus of claim 9, wherein:
the second controller switches a mode of the second LNA to a non-slotted mode when the second controller receives the active control signal and maintains a turned on state of the second LNA; and
the second controller switches a mode of the second LNA to a slotted mode when the second controller receives the inactive control signal and repeatedly turns on and off the second LNA.

13. The apparatus of claim 9, wherein the first and second controllers control a supply of power to the first and second LNAs according to a preset slot index cycle.

14. The apparatus of claim 8, wherein a first communication module comprises the first controller and the first LNA and a second communication module comprises the second controller and the second LNA, and further wherein the first communication module supports a communication network that is different than the communication network that the second communication module supports.

* * * * *